Oct. 29, 1968    R. BAILEY    3,407,853
ROUTER GUIDE
Filed April 27, 1966    2 Sheets-Sheet 1
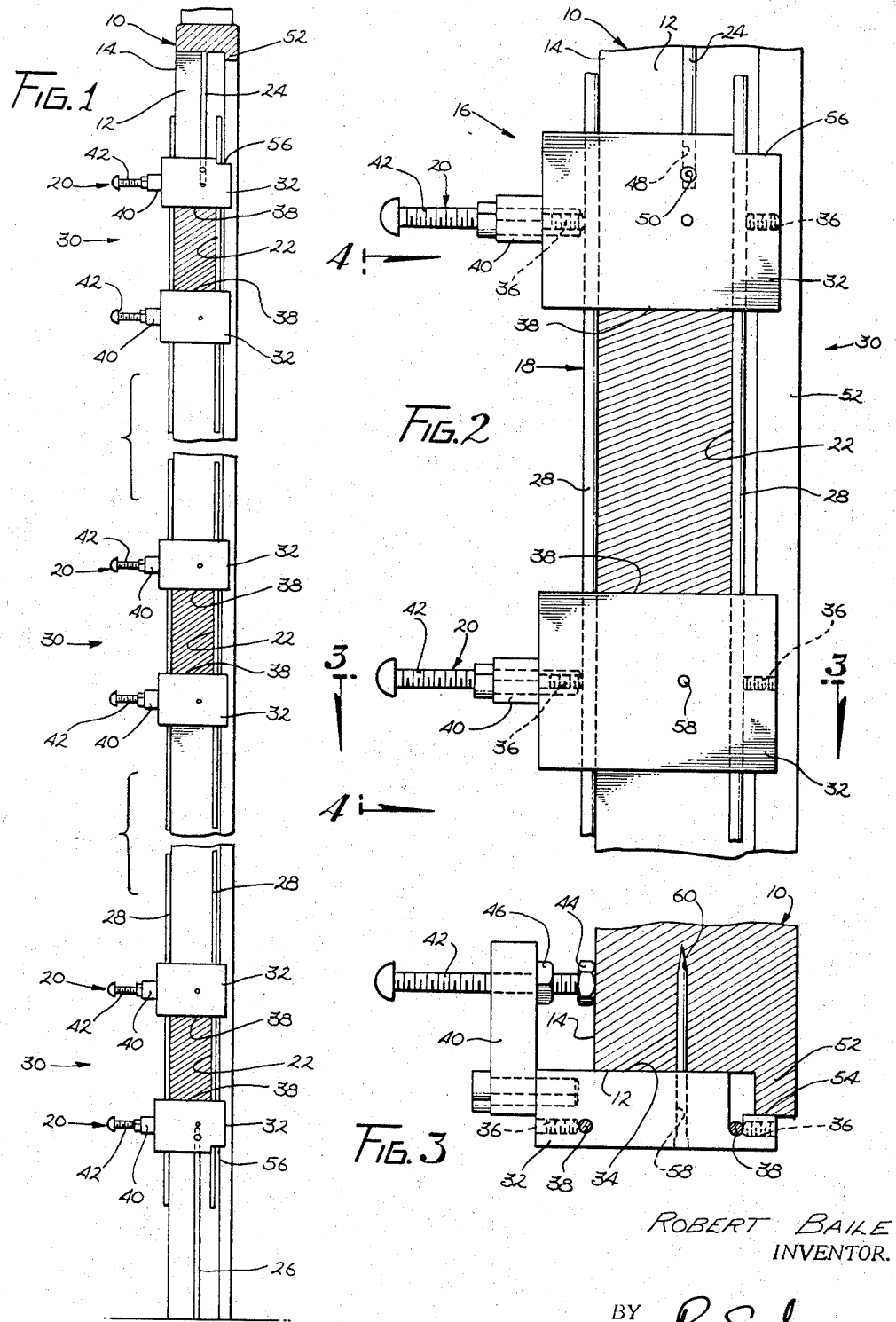
ROBERT BAILEY
INVENTOR.
BY R. E. Beaugue
ATTORNEY

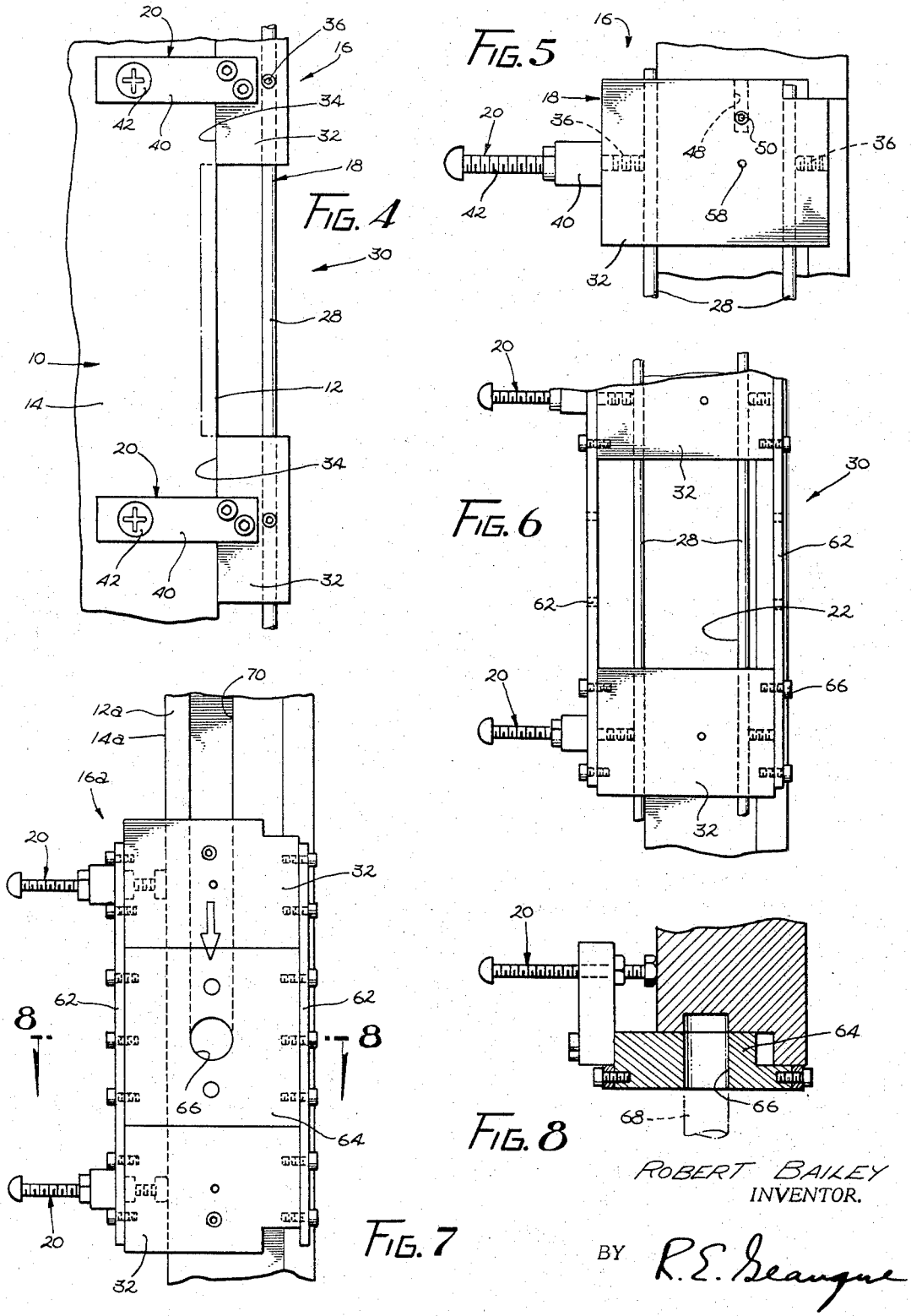

3,407,853
ROUTER GUIDE
Robert Bailey, 15340 Mayall St.,
Mission Hills, Calif. 91340
Filed Apr. 27, 1966, Ser. No. 545,655
8 Claims. (Cl. 144—144.5)

ABSTRACT OF THE DISCLOSURE

A router guide comprised of a pair of spaced parallel rods, a plurality of sets of blocks slidably mounted on the rods and independently adjustable along the rods, each set of blocks forming a space therebetween defining a pattern for routing a surface and means for adjustably supporting the router guide against a work surface.

---

This invention relates generally to woodworking devices and, more particularly, to a novel router guide.

In its broader aspects, the invention provides a router guide for use on a work piece having a work surface to be routed and a reference surface, disposed at right angles to and intersecting the work surface, relative to which the routed areas are to be located. The router guide includes a body which is adapted to seat against the work surface and is provided with a guide opening for receiving a routing tool and guiding the tool in its routing movement along the work surface. Disposed along one side of this body are lateral locating means which are engageable with the reference surface of the work piece to locate the guide opening relative to this surface, laterally of the work surface. In some cases, the router guide also may be equipped with longitudinal locating means for locating the guide opening along the work surface.

As will appear from the ensuing description, the router guide of the invention may be employed for various routing applications. One illustrative embodiment of the invention, for example, is an adjustable sliding bar template for use in routing hinge seats in doors and door jams. In this embodiment, the router guide or template is provided with a number of spaced guide openings for receiving a routing tool. Each guide opening is dimensioned to accommodate movement of the tool relative to the template and is bounded by edges which limit the movement of the tool relative to the template, thus to produce a routed hinge seat of accurately predetermined size and shape. A unique feature of this embodiment resides in the fact that the openings in the template are individually adjustable to vary the dimensions of the routed hinge seats and the several guide openings are adjustable relative to one another to vary the spacing between the routed hinge seats and the locations of the seats along the door and jam. Another feature of the inventive embodiment under discussion resides in locating means at the ends of the template which are effective to accurately bodily locate the template along the door jam and permit the template to be inverted in such a way as to enable routing of hinge seats in either or both sides of the jam.

A second illustrative embodiment of the invention is a sliding router guide having a guide opening which is dimensioned to closely receive the routing tool in such a way as to confine the tool against bodily movement relative to the guide. In this case, routing movement of the tool along the work surface is accomplished by bodily sliding the guide along the surface. This embodiment of the invention is particularly designed for rabbeting and mortising applications.

It is a general object of the present invention, therefore, to provide novel router guides of the character described.

A more specific object of the invention is to provide a novel router guide which comprises an adjustable sliding bar template for use in routing hinge seats in doors, door jams and the like.

A related object of the invention is to provide a router guide or template which is adjustable to vary the dimensions of the routed hinge seats as well as the locations of the routed seats relative to one another and to the door or door jam.

Another related object of the invention is to provide a router guide or template of the character described having locating means for accurately positioning the guide along the door jam, which positioning means permit inversion of the guide in such a way as to enable hinge seats to be routed in either or both sides of the jam.

A further object of the invention is to provide a sliding router guide for rabbeting and mortising applications.

Still a further object of the invention is to provide a router guide which is flexible, whereby it may be bent into an arcuate configuration conforming to a curved work surface.

Yet a further object of the invention is to provide router guides of the character described which are relatively simple in construction, economical to manufacture, lightweight, easy to use, yet rugged and durable, and are otherwise ideally suited to their intended purposes.

Other objects, advantages, and features of the invention will become readily evident as the description proceeds.

With these and such other objects in view, the invention consists in the construction, arrangement, and combination of the various parts of the invention, whereby the objects contemplated are obtained, as hereinafter set forth, pointed out in the appended claims, and illustrated in the accompanying drawings.

In these drawings:

FIGURE 1 is a side elevation of a router guide or sliding bar template according to the invention for use in routing hinge seats in a door or door jam;

FIGURE 2 is an enlarged fragmentary view of a portion of the router guide in FIGURE 1;

FIGURE 3 is a section taken on line 3—3 of FIGURE 2;

FIGURE 4 is a view looking in the direction of the arrows on line 4—4 in FIGURE 2;

FIGURE 5 is a fragmentary enlarged view of the upper end of the router guide in FIGURE 1 with a certain positioning or locating rod removed to enable the guide to seat flush against the top of the door jam;

FIGURE 6 illustrates a modification of the router guide in FIGURE 1 for fixing the dimensions of the routing tool receiving openings in the guide;

FIGURE 7 illustrates a sliding router guide according to the invention for rabbeting and mortising applications; and FIGURE 8 is a section taken on line 8—8 in FIGURE 7.

As noted earlier, the present invention, in its broader aspects, provides a router guide for use on a work piece having a work surface to be routed and a reference surface normal to and intersecting the work surface. In FIGURE 1, for example, there is illustrated a door jam 10 having an inner edge surface 12 forming a work surface in which hinge seats are to be routed and a side surface 14 forming a reference surface relative to which the hinge seats are to be located. The router guide 16 of the invention, which has been selected for illustration in FIGURES 1–5 of the drawings, is an adjustable sliding bar template for routing such hinge seats in the door jam 10. Briefly, the router guide 16 comprises a body 18 for seating against the work surface 12 of the door jam and lateral locating means 20 along one side of the body for engaging the reference surface 14 of the door jam. The body 18 of the router guide has a number of guide openings 22 spaced there along to receive a routing tool (not shown). In the inventive embodiment of FIGURES 1–5 the guide openings 22 are generally rectangular in shape and are dimensioned to correspond to the dimensions of the hinge seats to be routed. As will be explained presently, the router guide 16 is adjustable to vary the lengthwise dimensions of the guide openings 22 as well as the relative position of these openings, thereby to permit hinge seats of various dimensions and spacings to be routed in the door jam 10. The lateral locating means 20 of the router guide 16 are adjustable and serve to locate the guide openings 22 relative to the reference surface 14 and laterally of the work surface 12 of the door jam. At the ends of the router guide 16 are longitudinal locating means 24 and 26 which are engageable with the top and bottom of the door jam and serve to locate the router guide along the jam.

Referring now in greater detail to the router guide 16, the router guide body 18 comprises a pair of spaced parallel longitudinal supporting and guide opening defining members or rods 28 which are preferably relatively slender, and therefore flexible, for reasons to be explained presently. Along these rods are sets 30 of transverse guide opening defining members or blocks 32. Blocks 32 are independently adjustable along the rods 28. To this end, the blocks are bored to slidably receive the rods, as shown best in FIGURE 3. The blocks 32 have seating surfaces 34 which are adapted for seating engagement with the work surface 12 of the door jam 10 and, to this end, these surfaces are disposed in a common plane parallel to the rods 28. Threaded in the blocks 32 are set screws 36 which may be tightened against the rods 28 to releasably secure the blocks to the rods.

The rods 28 and the blocks 32 of the respective block sets 30 bound and define the guide openings 22, and serve to guide the routing tool in its routing movement along the edges of the routed hinge seats. To this end, the rods 28 are disposed adjacent the outer surfaces of the blocks, that is the block surfaces opposite their seating surfaces 34. The rods define the longitudinal sides of the guide openings 22. The confronting edge surfaces 38 of the blocks 32 in the respective block sets 30 are disposed in parallel planes normal to the rods 28 and define the ends of the guide openings 22.

In the particular router guide 16 illustrated in FIGURES 1–5, each block 32 carries a lateral locating means 20. Each lateral locating means comprises an arm 40 which is bolted or otherwise rigidly attached to the adjacent side edge of the respective block and extends normal to and beyond the seating surface 34 of the block. Threaded in the outer end of the arm, on an axis generally normal to the rods 28 and parallel to the seating surface 34 of the adjacent block 32, is a locating screw 42 having an inner work engaging head 44. A jam nut 46, threaded on the locating screw, is adapted to be tightened against the arm 40 to releasably lock the locating screw in a fixed axial position relative to the arm.

The longitudinal locating means 24 and 26 comprise rods which extend parallel to the main supporting rods 28 of the router guide. Each locating rod 24 and 26 has its inner end removably positioned in a socket bore 48 in the adjacent end block 32 of the router guide. The locating rods are releasably secured to their respective blocks by set screws 50.

A typical door jam 10 has a shoulder 52, defining a so-called blind stop, which extends along the sides and across the top of the jam, flush with the side of the jam opposite its reference surface 14. For this reason, the several blocks 32 of the router guide have recesses 54 along the sides remote from the lateral locating means 20, which recesses open through the seating surfaces 34 of the blocks to clear the vertical portions of the blind stop 52. The blocks 32 at the ends of the router guide have notches 56 in their corners to clear the portion of the blind stop which extend across the top of the jam.

As will appear presently, it is sometimes convenient to secure the router guide 16 in position while routing hinge seats into a door jam. To this end, the blocks 32 of the guide have openings 58 therethrough to receive fasteners 60, such as nails, which may be driven into the door jam. If desired, the fasteners 60 may be permanently fixed to the router guide blocks 32.

In use, the router guide 16 is placed against the door jam 10 to be routed in such a way that the seating surfaces 34 of the router guide blocks 32 seat against the work surface 12 of the jam and the inner heads 44 on the lateral locating screws 42 engage the reference surface 14 of the jam. The routing tool (not shown) is then inserted in through each of the openings 22 in the router guide and moved along the work surface 12 within the confines of the guide openings to route hinge seats in the work surface. The portions of the guide rods 28 and the edges 38 of the router guide blocks 32 which bound each of the guide openings 22 serve to guide the routing tool while routing the edges of each hinge seat, whereby the hinge seats are accurately formed and dimensioned.

It is significant to note at this point that the dimension of each router guide opening 22, lengthwise of the router guide 10, and hence the dimension of the routed hinge seat lengthwise of the door jam work surface 12, may be adjusted by relatively adjusting the blocks 32 of the respective block set 30 along the router guide rods 28. The locations of the hinge seats along the door jam may be adjusted by relatively adjusting the several block sets 30 along the rods. As noted earlier, this adjustment of the blocks and block sets is accomplished by releasing the set screws 36 which secure the blocks 32 to the rods 28. The lateral locating screws 42 are adjustable to position the router guide openings 22 laterally of the door jam work surface 12 relative to the reference surface 14, thus to adjust the corresponding dimension of each routed hinge seat. The longitudinal locating members 24, 26 are engageable with the top of the door jam 10 and the floor at the base of the jam, respectively, and are longitudinally dimensioned to properly bodily locate the router guide 16 along the jam.

It should be noted here that the router guide 16 may be used to route hinge seats in both sides of the door jam by simply turning the guide end for end when shifting the guide from one side of the jam to the other. In the event the locating members 24, 26 are of different length, as shown, they may be simply interchanged when moving the guide from one side of a jam to the other.

As noted earlier, it may be convenient to secure the router guide 16 to the door jam 10 while actually routing hinge seats in the door jam. This is accomplished by driving the fasteners 60 into the jam after the router guide has been properly adjusted to provide hinge seats of the desired size and location.

In the event that the router guide 16 is to be employed for routing many hinge seats of fixed dimension but variable spacing, it may be convenient to join the blocks 32 of each block set 30, thus to permit relative adjustment of the block sets without altering the dimensions of the router guide openings 22. This may be accomplished by bolting spacer members or bars 62 to opposite longitudinal sides of the blocks of each block set, in the manner illustrated in FIGURE 6.

The router guide 16 is used in much the same way as described above when routing hinge seats in the edge of a door. In this case, the body 18 of the guide is placed against the edge of the door and the lateral locating screws 42 are engaged with the side of the door.

Reference is now made to FIGURE 7 and 8 which illustrate a sliding router guide according to the invention which is useful in rabbeting and mortising applications. The router guide 16a comprises the two end guide blocks 32 of the router guide in FIGURES 1–5, the spacer bars 62 shown in FIGURE 6, and an additional router guide block 64 which is placed between the blocks 32 and bolted to the spacer members 62 as shown. Extending through the block 64 is an opening 66 to receive the bit 68 of a routing tool in the manner illustrated in FIGURE 8. In use, the router guide is placed on the work surface 12a to be routed in such a manner that the locating screws 42 carried by the router guide blocks 32 engage a side reference surface 14a of the work piece. The routing tool bit 68 is then inserted through the guide opening 66 in such a way that the inner end of the bit penetrates the work surface 12a to the desired depth. Thereafter, the router guide 16a and the routing tool are bodily moved in unison along the work surface to route a groove 70 in the surface. The spacing between this groove and the reference surface 14a of the work piece may be adjusted by adjusting the locating screws 42 of the router guide.

It is now obvious, therefore, that the invention herein described and illustrated is fully capable of obtaining several objects and advantages preliminarily set forth.

While certain embodiments of the invention have been disclosed for illustrative purposes, it is obvious that various modifications in the design, arrangement of parts and instrumentalities of the invention are possible within the spirit and scope of the following claims.

What is claimed as new in support of Letters Patent is:

1. A router guide for use on a work piece having a work surface to be routed and a reference surface intersecting said work surface, said guide comprising:
  a body adapted to seat on said work surface and having guide openings for receiving a routing tool and guiding said tool in its movement along said work surface;
  said body comprising a pair of parallel spaced rods extending generally parallel to said work surface, a plurality of pairs of blocks spaced along said rods, each pair of blocks and said rods defining therebetween one of said openings; and means adjustably securing said block to said rods in such a manner as to permit adjustment of said blocks along said rods to selectively shift the position of said guide openings lengthwise of said rods and vary the dimensions of said guide openings lengthwise of said rods.

2. A router guide as defined in claim 1 having locating means on at least some of said blocks and engageable with said reference surface to locate said guide openings relative to said reference surface.

3. A router guide as defined in claim 2 having means for adjusting said locating means laterally of said rods to shift with said guide openings laterally of said work surface.

4. A router guide for use in routing hinge seats in a surface of a work piece such as a door, a door jam or the like comprising:
  a pair of long, spaced parallel rods;
  a number of sets of blocks spaced along said rods;
  each said block set comprising a pair of blocks spaced along said rods;
  said rods and the blocks of each said block set defining therebetween a guide opening to receive a routing tool;
  said block sets being independently adjustable along said rods to shift the positions of said guide openings along said rods and the blocks of each set being relatively adjustable along said rods to vary the dimension of said guide openings lengthwise of said rods;
  means releasably securing said blocks to said rods;
  said blocks having seating surfaces disposed substantially in a common plane parallel to said rods and adapted for seating engagement with said work surface; and
  lateral locating means carried by at least certain of said blocks and disposed beyond said seating surfaces for engagement with the side of the work piece to locate said guide openings relative to said latter side.

5. A router guide according to claim 4 wherein:
  said locating means are adjustable laterally of said rods to shift the position of said guide openings laterally of said work surface.

6. A router guide according to claim 4 including:
  locating members extending from the blocks adjacent the ends of said rods and adapted for engagement with the top and bottom of a door jam to bodily locate said guide relative to said jam.

7. A router guide according to claim 4 wherein:
  at least some of said blocks have openings to receive fasteners for securing said guide to the work piece.

8. A router guide according to claim 4 wherein:
  said rods are flexible to permit said guide to be bent into an arcuate configuration.

References Cited

UNITED STATES PATENTS

| | | | |
|---|---|---|---|
| 1,524,234 | 1/1925 | Carter | 144—27 |
| 2,629,937 | 3/1953 | Tubbs | 144—27 X |
| 2,660,803 | 12/1953 | Sacrey | 144—27 X |
| 2,869,245 | 1/1959 | Bork | 144—27 X |
| 2,927,378 | 3/1960 | Godfrey et al. | 144—27 X |

DONALD R. SCHRAN, *Primary Examiner.*